United States Patent
Song

(10) Patent No.: US 8,086,890 B2
(45) Date of Patent: Dec. 27, 2011

(54) VIRTUAL MACHINE MONITOR, VIRTUAL MACHINE SYSTEM AND CLOCK DISTRIBUTION METHOD THEREOF

(75) Inventor: Wei Song, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 528 days.

(21) Appl. No.: 12/273,873

(22) Filed: Nov. 19, 2008

(65) Prior Publication Data
US 2009/0132846 A1 May 21, 2009

(30) Foreign Application Priority Data
Nov. 19, 2007 (CN) .......................... 2007 1 0177659

(51) Int. Cl.
*G06F 1/00* (2006.01)
(52) U.S. Cl. .................... 713/500; 713/600; 713/400
(58) Field of Classification Search .......... 713/500–600, 713/300–400; 710/305–306
See application file for complete search history.

(56) References Cited

U.S. PATENT DOCUMENTS
2007/0033589 A1 * 2/2007 Nicholas et al. ................. 718/1
* cited by examiner

*Primary Examiner* — Brian Misiura
*Assistant Examiner* — Kim Huynh
(74) *Attorney, Agent, or Firm* — Patterson Thuente Christensen Pedersen, P.A.

(57) ABSTRACT

A virtual machine monitor, a virtual machine system and a clock distribution method thereof. The clock distribution method includes: distributing real clock resource to a Guest Operation System (GOS), and saving correspondence between said GOS and said real clock resource; intercepting an access operation of said GOS to a virtual clock resource; sending said access operation to the corresponding real clock resource according to said correspondence, and then performing a write operation, or injecting an interrupt of said real clock resource into a local Advanced Programmable Interrupt Controllers (APIC) of a virtual CPU of the corresponding GOS of said GOSs.

16 Claims, 3 Drawing Sheets

VIRTUAL MACHINE MONITOR, VIRTUAL MACHINE SYSTEM AND CLOCK DISTRIBUTION METHOD THEREOF

RELATED APPLICATION

The present application claims priority to Chinese Application No. 200710177659.4 filed Nov. 19, 2007, which is incorporated herein in its entirety by reference.

BACKGROUND OF THE INVENTION

1. Field of Invention

The present invention relates to computer virtualization technology, more particularly, to a virtual machine monitor, a virtual machine system and a clock distribution method thereof.

2. Description of Prior Art

Virtualization technology may be used to simultaneously run a plurality of Guest Operation Systems (GOSs) and a plurality of virtual CPUs on one and the same hardware platform.

Timing in the existing computer is provided from six kinds of clock hardware, each of which provides a clock square wave signal input based on a crystal oscillator with a fixed frequency. Different operating systems may select appropriate clock hardware as their own timers.

The existing six kinds of clock hardware are illustrated as follows.

High Precision Event Timer (HPET), which provides a highly precise clock, and may provide up to 32 timers, with precision and efficiency higher than other clocks;

Real Time Clock (RTC), which is powered by a battery on a main board, so that it can hold time after PC power-down. It is also called a CMOS timer;

Programmable Interval Timer (PIT), which generates a periodic clock interrupt signal by Interrupt Request 0 (IROO);

Power Manager Timer (PMT);

Local Advanced Programmable Interrupt Controller (APIC) Vector Table Timer (LVTT); and Time Stamp Counter (TSC), which is an incremental timer, increases one each time a clock signal of the CPU arrives. The value of the TSC can be read through an assembly instruction. With the TSC of the CPU, the operating system usually may obtain a more precise time metric.

In the existing virtual machine system, a Virtual Machine Monitor (VMM) virtualizes all of the clock hardware described above, so that all the GOSs can share these virtual clocks.

Since all of these clocks in the VMM are virtual, disadvantages of inaccurate timing and time delay may occur. Therefore, there is a need to provide GOSs of a virtual machine system with an accurate clock.

SUMMARY OF THE INVENTION

An object of the present invention is to provide a virtual machine monitor, a virtual machine system and a clock distribution method thereof, for providing an accurate clock for a GOS of the virtual machine system.

To achieve the above object, one embodiment of the present invention provides a clock distribution method for the virtual machine system, which comprises the following steps:

distributing a real clock resource to a GOS, and saving correspondence between said GOS and said real clock resource;

intercepting an access operation of said GOS to a virtual clock resource;

forwarding said access operation to the corresponding real clock resource according to said correspondence, and performing a write operation, or injecting an interrupt of said real clock resource into a local Advanced Programmable Interrupt Controller (APIC) of a virtual CPU of the corresponding GOS.

Another embodiment of the present invention provides a virtual machine monitor, comprising:

an intercepting module, for intercepting an access operation of a GOS to a virtual clock resource;

a correspondence setting and saving module, for distributing a different real clock resource to said GOS, and saving the correspondence between said GOS and said real clock resource;

a forwarding module, for forwarding the intercepted access operation of said GOS to said virtual clock resource to corresponding real clock resource among said real clock resources, according to said correspondence;

a first interrupt injecting module, for injecting an interrupt of said real clock resource into a local Advanced Programmable Interrupt Controller (APIC) of a virtual CPU of the corresponding GOS, according to said correspondence.

Another embodiment of the present invention provides a virtual machine system, comprising a GOS, a virtual machine monitor and a real clock resource, wherein, the virtual machine monitor comprises:

a correspondence setting and saving module, for distributing a different real clock resource to said GOS, and saving correspondence between said GOS and said real clock resource;

a forwarding module, for forwarding an intercepted access operation of said GOS to said virtual clock resource to corresponding real clock resource among said real clock resources, according to said correspondence;

a first interrupt injecting module, for injecting an interrupt of said real clock resource into a local Advanced Programmable Interrupt Controller (APIC) of a virtual CPU of the corresponding GOS, according to said correspondence.

One or more embodiments of the present invention have at least the following advantage.

As the virtual machine monitor distributes a different real clock resource to the GOS and saves the correspondence between the GOS and the real clock resource, the access operation of the GOS to the virtual clock resource may be forwarded to the real clock resource by the virtual machine monitor. The real clock resource may provide accurate clock services for the GOS, and thus the problem of the inaccurate clocking caused by the virtual clock in conventional solutions may be resolved.

DETAILED DESCRIPTION OF THE PREFERRED EMBODIMENTS

A virtual machine monitor, a virtual machine system and a clock distribution method thereof, according to embodiments of the present invention, distribute real hardware clock resource to a GOS in the virtual machine system in advance. A VMM performs corresponding processing on corresponding real hardware clock resource when the GOS perform a clock read/write operation.

In the following, different embodiments of the present invention will be described in detail with reference to the attached drawings.

As mentioned in the above, a HPET provides a highly precise clock, which may provide up to 32 timers, with precision and efficiency higher than other clocks. Therefore, a HPET is used to provide a clock for the GOS in the first embodiment of the present invention.

Figure 1:
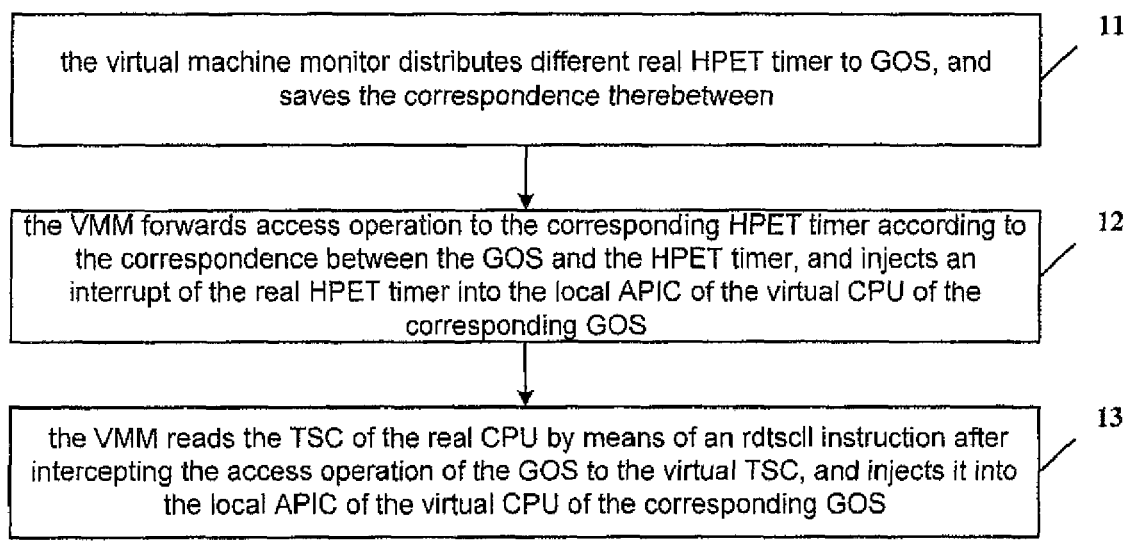
FIG. 1 is a flow schematic diagram of a method according to a first embodiment of the present invention.

As shown in FIG. 1, the clock distribution method for the virtual machine system according to the first embodiment of the present invention comprises the following steps:

Step 11, clock distribution, wherein the virtual machine monitor distributes different real HPET to the GOS, and saves correspondence between the GOS and the HPET;

Step 12, clock usage, wherein the VMM forwards, to a corresponding HPET, a MMIO (Memory Map Input and Output) access operation of the GOS to a virtual clock resource except for the virtual TSC, after intercepting the MMIO access operation, and then performs a write operation on the HPET, or injects an interrupt of the real HPET into a local Advanced Programmable Interrupt Controller (APIC) of a virtual CPU of the corresponding GOS.

With the TSC of the CPU, an operating system usually may obtain a more accurate time metric. To this end, the method according to the first embodiment of the present invention further comprises:

Step 13, the VMM reads the TSC of the real CPU by means of an rdtscll instruction after intercepting an access operation of the GOS to the virtual TSC, and injects the read TSC into the local APIC of the virtual CPU of the corresponding GOS.

The correspondence between the GOS and the HPET, saved in the step 11, may be presented by an offset address of the memory or other parameters.

Figure 2:
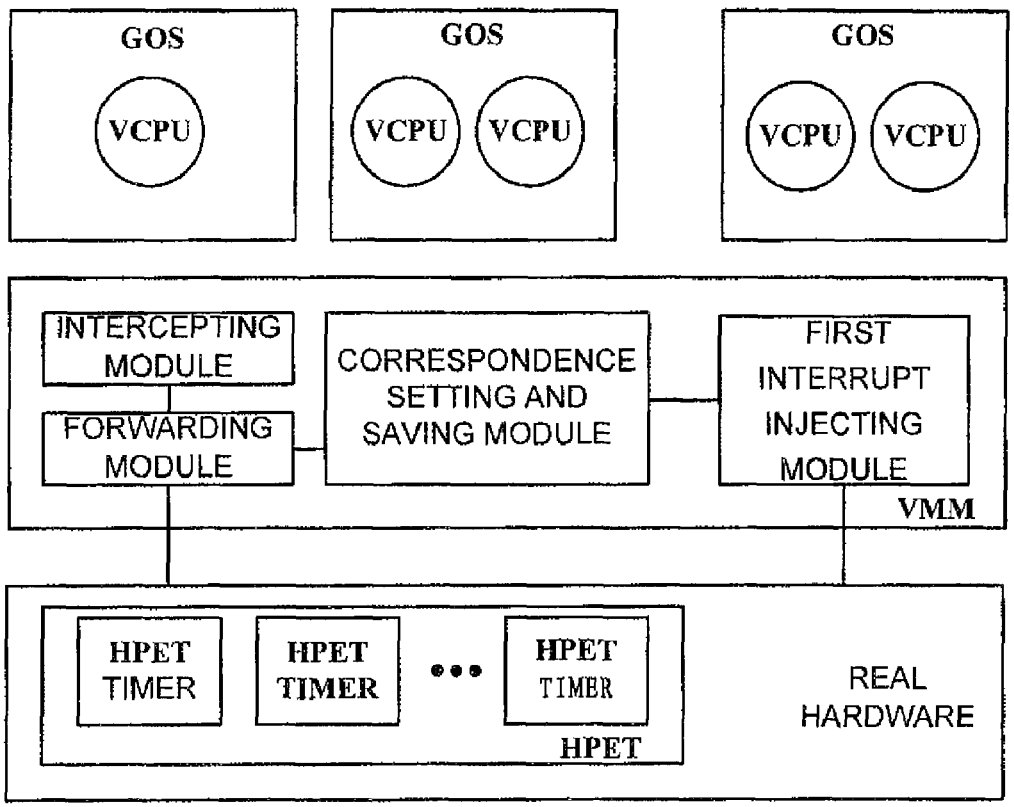
FIG. 2 is a structural schematic diagram of a virtual machine system according to the first embodiment of the present invention.

The virtual machine system according to the first embodiment of the present invention comprises one or more GOSs, a VMM and a real clock resource. As shown in FIG. 2, the VMM comprises:

a correspondence setting and saving module, for distributing different real HPET to a GOS, and saving correspondence between the GOS and the corresponding real clock resource;

an intercepting module, for intercepting a MMIO access operation of the GOS to a virtual clock resource except for the virtual TSC;

a forwarding module, for forwarding the intercepted access operation to the corresponding HPET of the real HPET, according to the correspondence between the GOS and the HPET;

a first interrupt injecting module, for injecting an interrupt of the real HPET into a Local APIC of a virtual CPU of the corresponding SOS.

Of course, in the case that the operating system obtains a more accurate time metric by using the TSC of the CPU, the VMM of the present invention further comprises a TSC obtaining module and a second interrupt injecting module, wherein:

the intercepting module intercepts an access operation of the GOS to the virtual TSC;

the TSC obtaining module is adapted to read the TSC of the real CPU by means of an rdtscll instruction;

the second injection module is adapted to inject the TSC of the real CPU into the local APIC of the virtual CPU of the corresponding GOS.

In the first embodiment of the present invention, the HPET is used to provide a clock for the GOS. The real clock resource may further comprise RTC, PIT, PMT and LVTT and so on. Therefore, the second embodiment of the present invention will be illustrated in detail, in which the HPET, RTC, PIT, PMT and LVTT provide clocks for the GOS.

Figure 3:
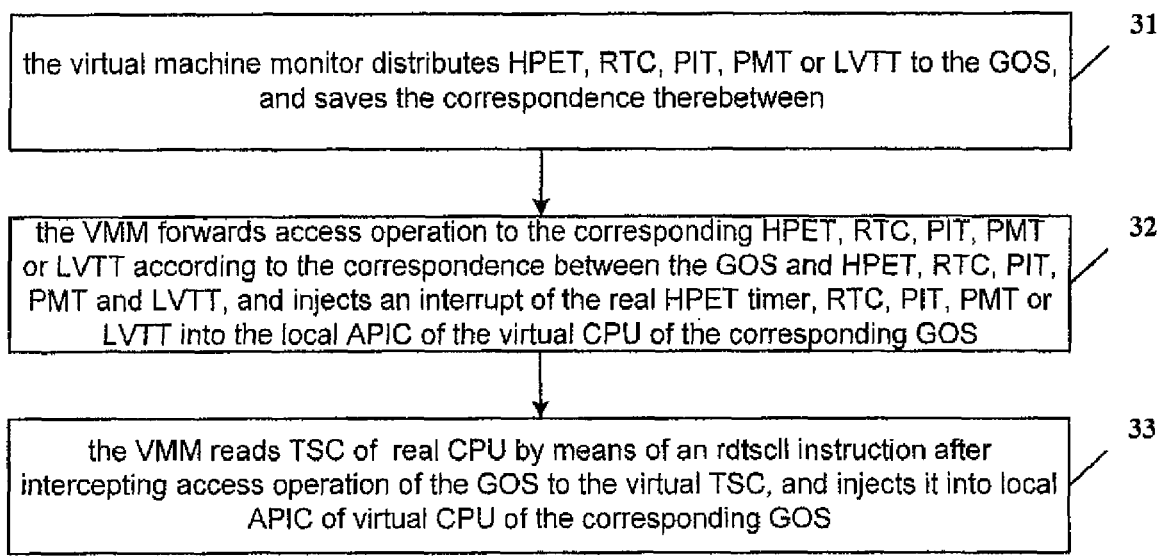
FIG. 3 is a flow schematic diagram of a method according to a second embodiment of the present invention.

As shown in FIG. 3, a clock distribution method for a virtual machine system according to the second embodiment of the present invention comprises the following steps:

Step 21, a virtual machine monitor distributes the HPET, RTC, PIT, PMT and LVTT to a GOS, and saves correspondence between a corresponding GOS and the HPET, RTC, PIT, PMT and LVTT;

Step 22, the VMM forwards, to the HPET, RTC, PIT, PMT or LVTT, a MMIO access operation of the GOS to a virtual clock resource except for the virtual TSC, according to the correspondence between the GOS and HPET, RTC, PIT, PMT and LVTT, after intercepting the MMIO access operation, and performs a write operation on the HPET, RTC, PIT, PMT or LVTT, or injects an interrupt of the HPET, RTC, PIT, PMT or LVTT into a local APIC of a virtual CPU of the corresponding GOS.

Since the operating system usually may obtain a more accurate time metric by using the TSC of the CPU, the method according to the second embodiment of the present invention further comprises:

Step 23, the VMM reads the TSC of the real CPU by means of an rdtscll instruction after intercepting the access operation of the GOS to the virtual TSC, and injects it into the local APIC of the virtual CPU of the corresponding GOS.

Since the precisions of these real clock resources, such as HPET, RTC, PIT, PMT and LVTT, are different, the real clock resources with higher precision may be distributed to those GOSs with higher priority during the distribution. For example, those time-sensitive GOSs, such as windows, or applications may be distributed with a HPET, while others with relatively lower requirements may be distributed with a RTC, PIT, PMT or LVTT.

However, when using the HPET, RTC, PIT, PMT and LVTT as the real clock resources, one GOS using the HPFT may perform a write operation on a register with an offset of 0x10 and stops the operations of the real RTC and PIT on the main-board. Accordingly, the second embodiment of the present invention further comprises:

Step 24, the VMM intercepts the write operation of the GOS with respect to the HPET on the register with an offset of 0x10.

After the intercepting, the RTC and PIT do not stop running, and provide real clock resources for the other GOSs.

As will be appreciated by those skilled in the art, all or part of the steps of the method according to the above embodiments may be implemented by instructing the related hardware through a program, which may be stored in a computer readable storage medium, and may comprise the following steps when being executed:

Step 21, the virtual machine monitor distributes the HPET, RTC, PIT, PMT and LVTT to a GOS, and saves the correspondence between the corresponding GOS and the HPET, RTC, PIT, PMT and LVTT;

Step 22, the VMM forwards a MMIO access operation of the GOS to a virtual clock resource except for the virtual TSC, to the HPET, RTC, PIT, PMT or LVTT according to the correspondence between the GOS and HPET, RTC, PMT and LVTT, after intercepting the MMIO access operation, and performs a write operation on the HPET, RTC, PIT, PMT or LVTT, or injects an interrupt of the HPET, RTC, PIT, PMT or LVTT into the local APIC of the virtual CPU of the corresponding GOS.

Since the operating system usually obtains a more accurate time metric by using the TSC of the CPU, the method according to the second embodiment of the present invention further comprises:

Step 23, the VMM reads the TSC of the real CPU by means of an rdtscll instruction, after intercepting the access operation of the GOS to the virtual TSC, and injects the read TSC into a local APIC of a virtual CPU of the corresponding GOS.

Since the precisions of these real clock resources, such as HPET, RTC, PIT, PMT and LVTT, are different, the real clock resources with higher precision may be distributed to those GOSs with higher priority during the distribution. For example, those time-sensitive GOSs, such as windows, or applications may be distributed with a HPET, while others with relatively lower requirements may be distributed with RTC, PIT, PMT or LVTT.

However, when using the HPET, RTC, PIT, PMT and LVTT as the real clock resources, one GOS using the HPET may perform a write operation on a register with an offset of 0x10 and stops the operations of the real RTC and PIT on the main-board. Accordingly, the second embodiment of the present invention farther comprises:

Step 24, the VMM intercepts the write operation of the GOS on the register with an offset of 0x10.

After the intercepting, the RTC and PIT do not stop running, and provide the real clock resource for the other GOSs.

The storage medium is for example ROM/RAM, diskette, CD, and the like.

The virtual machine system according to the second embodiment of the present invention comprises one or more GOSs, a VMM and a real clock resource, wherein, the VMM comprises:

a correspondence setting and saving module, for distributing differently HPET, RTC, PIT, PMT and LVTT to the GOS, and for saving the correspondence between said GOS and said real clock resource;

a first intercepting module, for intercepting a MMIO access operation of the GOS to a virtual clock resource except for the virtual TSC;

a forwarding module, for forwarding the intercepted access operation to a corresponding HPET, RTC, PIT, PMT or LVTT, according to the correspondence between the GOS and the HPET, RTC, PIT, PMT and LVTT;

a first interrupt injecting module, for injecting an interrupt of the HPET, RTC, PIT, PMT or LVTT into a Local APIC of a virtual CPU of the corresponding GOS, according to said correspondence;

an intercepting module, for intercepting a write operation of the GOS on the register with an offset of 0x10.

Of course, in the case that the operating system obtains a more accurate time metric by using the TSC of the CPU, the VMM in the present invention further comprises a TSC obtaining module and a second interrupt injecting module, wherein:

the first intercepting module is further adapted to intercept an access operation of the GOS to the virtual TSC; the TSC obtaining module is adapted to read the TSC of the real CPU by means of an rdtscll instruction;

the second injection module is adapted to inject the TSC of the real CPU into the local APIC of the virtual CPU of the corresponding GOS.

In the first embodiment and the second embodiment of the present invention, the HPET and the real clock resources are used to provide the clocks of the GOS, respectively, while the third embodiment of the present invention will be illustrated in detail by using the HPET, RTG, PIT, PMT and LVTT to provide the clocks of the GOS.

For illustration, the HPET, RTC, PIT, PMT and LVTT are named as third clock resources.

Figure 4:
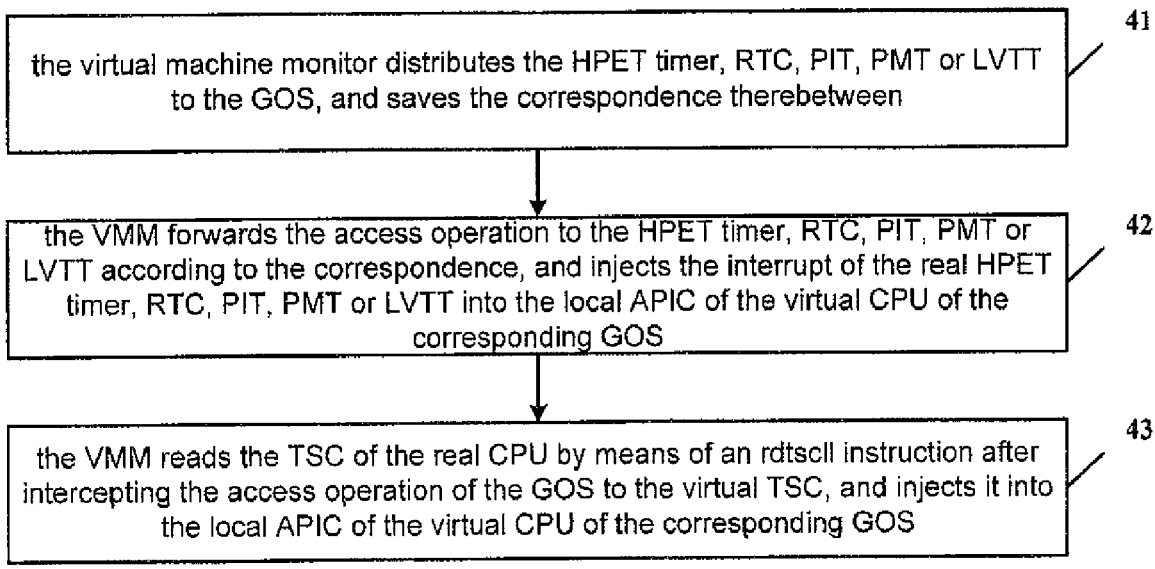
FIG. 4 is a flow schematic diagram of a method according to a third embodiment of the present invention.

As shown in FIG. 4, a clock distribution method for the virtual machine system according to the third embodiment of the present invention comprises the following steps:

Step 41, clock distribution, wherein the virtual machine monitor distributes a HPET, RTG, PIT, PMT or LVTT to the GOS, and saves correspondence between the corresponding GOS and the HPET, RTG, PIT, PMT or LVTT;

Step 42, clock usage, wherein the VMM forwards a MMIO access operations of the GOS to a virtual clock resource except for the virtual TSC, to the HPET, RTC, PIT, PMT or LVTT according to the correspondence between the GOS and HPET, RTC, PIT, PMT and LVTT, after intercepting the MMIO access operation, and performs a write operation on the HPET, RTC, PIT, PMT or LVTT, or injects an interrupt of the HPET, RTC, PIT, PMT or LVTT into a local APIC of a virtual CPU of the corresponding GOS.

Since the operating system usually obtains a more accurate time metric by using the TSC of the CPU, the method according to the third embodiment of the present invention further comprises:

Step 43, wherein the VMM reads the TSC of the real CPU by means of an rdtscll instruction after intercepting the access operation of the GOS to the virtual TSC, and injects it into the local APIC of the virtual CPU of the corresponding GOS.

Similar to that of the second embodiment, the method of the third embodiment also comprises a step in which the VMM intercepts the write operation of the GOS with respect to the HPET on the register with an offset of 0x10.

Since the precisions of these real clock resources, such as HPET, RTC, PIT, PMT and LVTT, are different, the real clock resources with higher precision may be distributed to the GOSs with higher priority during the distribution. For example, those time-sensitive GOSs, such as windows, or applications may be distributed with a HPET, while the others with relatively lower requirements may be distributed with RTC, PIT, PMT or LVTT.

The virtual machine system according to the third embodiment of the present invention comprises one or more GOSs, a VMM and real clock resources, wherein, the VMM comprises:

a correspondence setting and saving module, for distributing the HPET, RTC, PIT, PMT and LVTT to the GOS, and for saving the correspondence between the corresponding GOS and the HPET, RTC, PIT, PMT and LVTT;

an intercepting module, for intercepting a MMIO access operation of the GOS to a virtual clock resource except for the virtual TSC;

a forwarding module, for forwarding the intercepted MMIO access operation to the corresponding HPET, RTC, PIT, PMT or LVTT, according to the correspondence between the OS and the HPET, RTC, PIT, PMT and LVTT;

a first interrupt injecting module, for injecting an interrupt of the HPET, RTC, PIT, PMT or LVTT into a Local APIC of a virtual CPU of the corresponding GOS, according to said correspondences;

an intercepting module, for intercepting the write operation of the GOS on the register of an offset of 0x10.

Of course, in the case that the operating system obtains a more accurate time metric by using the TSC of the CPU, the VMM of the present invention further comprises a TSC obtaining module and a second interrupt injecting module, wherein:

the intercepting module is further adapted to intercept the access operation of the GOS to the virtual TSC;

the TSC obtaining module is adapted to read the TSC of the real CPU by means of an rdtscll instruction;

the second interrupt injection module is adapted to inject the TSC of the real CPU into the local APIC of the virtual CPU in the corresponding GOS.

It should be noted that, the above are only illustrated embodiments of the present invention, for those skilled in the art, there may be various alternations and modifications in the present invention without departing from the principle of the present invention. Any modifications, substitutions or improvements made within the spirit and principle of the present invention should fall into the protection scope of the present invention.

What is claimed is:

1. A clock distribution method for a virtual machine system, comprising the following steps:
    distributing a real clock resource to a Guest Operation System (GOS), and saving correspondence between said GOS and said real clock resource;
    intercepting an access operation of said GOS to a virtual clock resource;
    forwarding said access operation to the corresponding real clock resource according to said correspondence, and performing a write operation, or injecting an interrupt of said real clock resource into a local Advanced Programmable Interrupt Controller (APIC) of a virtual CPU of the corresponding GOS.

2. The method according to claim 1, further comprising the steps of: reading a time stamp counter of a real CPU; and injecting said time stamp counter into the local APIC of the virtual CPU of said GOS.

3. The method according to claim 2, wherein the step of reading the time stamp counter of the real CPU comprises reading the time stamp counter of the real CPU by means of an rdtscll instruction.

4. The method according to claim 1, wherein said real clock resource is selected from a group consisting of:
    a High Precision Event Timer (HPET), a Real Time Clock (RTC), a Programmable Interval Timer (PIT), a Power Manager Time (PMT), and a Local APIC Vector Table Timer (LVTT).

5. The method according to claim 4, wherein said real clock resource is either the RTC or the PIT, and the method further comprises the step of:
    intercepting a write operation of the GOS with respect to the HPET on a register with an offset of 0x10.

6. A virtual machine monitor, comprising:
    an intercepting module, for intercepting an access operation of a GOS to a virtual clock resource wherein the virtual machine monitor further comprises:
    a correspondence setting and saving module, for distributing different real clock resources to said GOS, and for saving correspondence between said GOS and said real clock resources;
    a forwarding module, for forwarding the intercepted access operation of said GOS to said virtual clock resource to corresponding real clock resource among said real clock resources, according to said correspondence;
    a first interrupt injecting module, for injecting an interrupt of said real clock resource into a Local APIC of a virtual CPU of the corresponding GOS, according to said correspondence.

7. The virtual machine monitor according to claim 6, wherein the virtual machine monitor further comprises:
    a second interrupt injecting module, for injecting a time stamp counter of a real CPU into the local APIC of the virtual CPU of said GOS.

8. The virtual machine monitor according to claim 6, wherein said real clock resources are selected from a group consisting of:
    a High Precision Event Timer (HPET), a Real Time Clock (RTC), a Programmable Interval Timer (PIT), a Power Manager Time (PMT), and a Local APIC Vector Table Timer (LVTT).

9. The virtual machine monitor according to claim 8, wherein said real clock resource is either the RTC or the PIT, and the virtual machine monitor further comprises:
    an intercepting module, for intercepting a write operation of the GOS with respect to the HPET on a register with an offset of 0x10.

10. A virtual machine system, comprising a GOS, a virtual machine monitor, and a real clock resource, wherein, said virtual machine monitor comprises:
    a correspondence setting and saving module, for distributing different real clock resources to said GOS, and saving correspondence between said GOS and said real clock resources;
    a forwarding module, for forwarding an intercepted access operation of said GOS to a virtual clock resource to the corresponding real clock resource among said real clock resources, according to said correspondence; and
    a first interrupt injecting module, for injecting an interrupt of said true clock resource into a Local APIC of a virtual CPU of the corresponding GOS, according to said correspondence.

11. The virtual machine system according to claim 10, wherein said virtual machine monitor further comprises:
    a second interrupt injecting module, for injecting a time stamp counter of a real CPU into the local APIC of the virtual CPU of said GOS.

12. The virtual machine system according to claim 10, wherein said real clock resources include:
    a High Precision Event Timer (HPET), a Real Time Clock (RTC), a Programmable Interval Timer (PIT), a Power Manager Time (PMT), and a Local APIC Vector Table Timer (LVTT).

13. The virtual machine system according to claim 12, wherein said real clock resources are either the RTC or the PIT, and the virtual machine monitor further comprises:
    an intercepting module, for intercepting a write operation of the GOS with respect to the HPET on a register with an offset of 0x10.

14. The method according to claim 1, wherein, said real clock resource is a High Precision Event Timer (HPET).

15. The method according to claim 6, wherein said real clock resource is a High Precision Event Timer (HPET).

16. The method according to claim 10, wherein said real clock resource is a High Precision Event Timer (HPET).

* * * * *